United States Patent [19]

Runnalls

[11] Patent Number: 4,786,908

[45] Date of Patent: Nov. 22, 1988

[54] APPARATUS INCORPORATING RECURSIVE ESTIMATORS

[75] Inventor: Andrew R. Runnalls, Faversham, England

[73] Assignee: GEC Avionics Limited, England

[21] Appl. No.: 874,332

[22] Filed: May 15, 1986

[30] Foreign Application Priority Data

May 15, 1985 [GB] United Kingdom ............... 8512340

[51] Int. Cl.⁴ .............................................. G01S 13/00
[52] U.S. Cl. ........................................ 342/63; 342/65; 364/449
[58] Field of Search .............................. 342/63, 64, 65; 364/449, 450, 454

[56] References Cited

U.S. PATENT DOCUMENTS

| 3,327,306 | 6/1967 | Ellert et al. | 342/65 X |
| 3,404,398 | 10/1968 | Hoban et al. | 342/65 |
| 3,740,750 | 6/1973 | Moulton | 342/65 X |
| 3,795,909 | 3/1974 | Vehrs, Jr. | 342/65 |
| 4,144,571 | 3/1979 | Webber | 342/63 X |
| 4,179,693 | 12/1979 | Evans et al. | 342/64 |
| 4,495,580 | 1/1985 | Keearns | 342/64 X |
| 4,520,445 | 5/1985 | Keearns | 342/65 X |
| 4,646,244 | 2/1987 | Bateman et al. | 342/65 X |

FOREIGN PATENT DOCUMENTS 860527  1/1971  Canada .................................. 342/65

OTHER PUBLICATIONS

Liche, "Onboard and Ground Test of an Autonomous Navigation System Based on Terrain Correlation", AGARD Conf. Proc., No. 299, Subsystem Testing and Flight Test Instrumentation, Geilo, Norway, Oct. 1980, pp. 4-1→4-11.

IEEE Transactions on Automatic Control, vol. AC-28, No. 3, Mar. 1983, "Non-Linear Kalman Filtering Techniques for Terrain-Aided Navigation", L. D. Hostetler and R. D. Andreas, pp. 315-323.

Primary Examiner—Theodore M. Blum
Assistant Examiner—John B. Sotomayor
Attorney, Agent, or Firm—Kirschstein, Kirschstein, Ottinger & Israel

[57] ABSTRACT

An apparatus incorporating recursive estimators, more particularly apparatus for measuring the state of a dynamic system using a recursive estimator for modelling the dynamic behavior of the system, and navigation systems using a recursive estimator for navigation integration. Also disclosed are novel methods of updating the inputs to the estimators of such apparatus and systems.

14 Claims, 10 Drawing Sheets

TRANSECT LENGTH
RADAR ALTIMETER NOISE
BARO-INERTIAL DRIFT
SENSED PROFILE
TRANSECT REFERENCE POINT (TRP)

TRANSECT REFERENCE POINT
TRANSECT POINTS
TRANSECT LENGTH
$\Delta x_i$
$\Delta y_i$

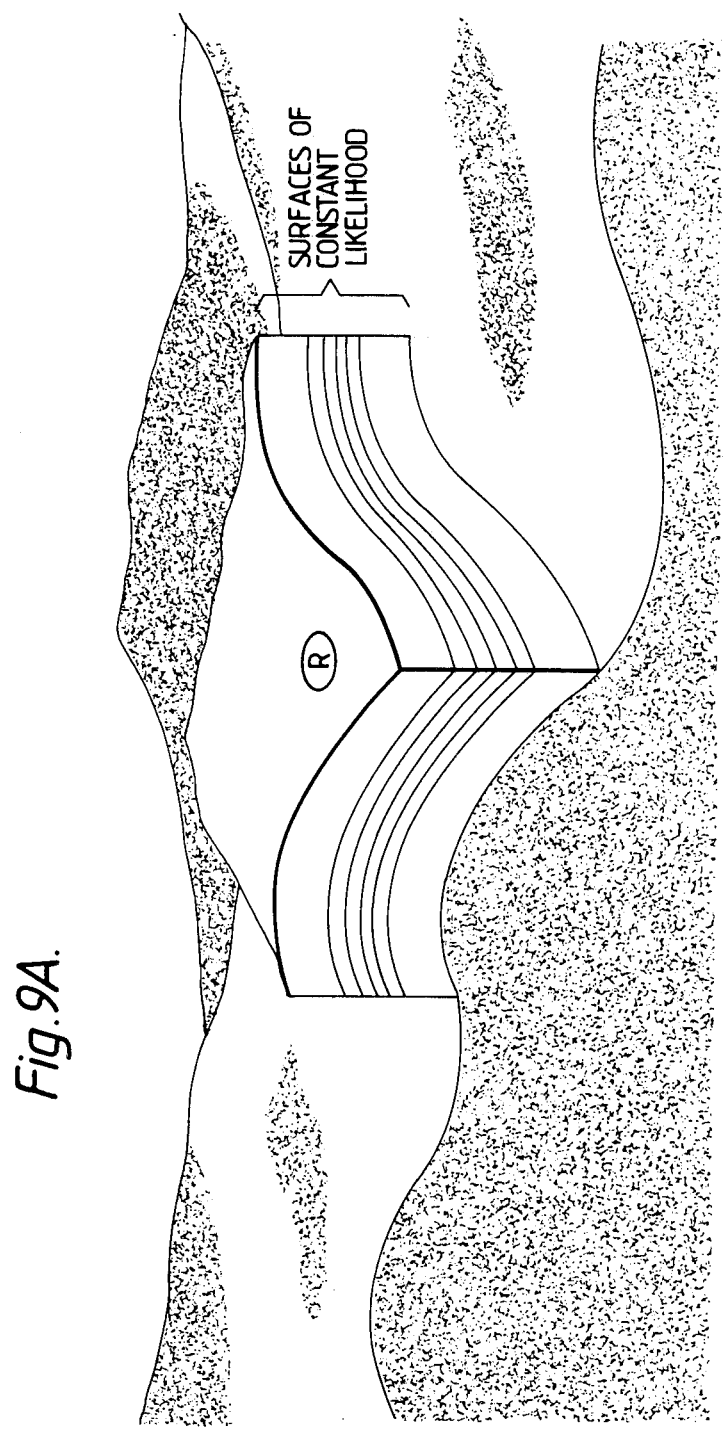

APPARATUS INCORPORATING RECURSIVE ESTIMATORS

FIELD OF THE INVENTION

This invention relates to apparatus incorporating recursive estimators, for example, Kalman filters.

SUMMARY OF THE INVENTION

It is an object of the present invention to provide a novel form of apparatus for measuring the state of a dynamic system using a recursive estimator to model the dynamic behaviour of the system. The invention also provides a novel method of updating the inputs to a recursive estimator used for navigation integration in a navigation system.

According to one aspect of the present invention an apparatus for measuring the state of a dynamic system comprises:
(a) sensing means for producing a sequence of measurements or sets of measurements which are dependent upon the current state of the said system in the presence of noise and other sources of error being sources which are representable by a statistical model;
(b) first computing means for determining a log-likelihood function associated with each of the said measurements or sets of measurements in accordance with the said statistical model;
(c) second computing means for obtaining the sum of log-likelihood function and a residual function which is initially set to be identically zero;
(d) third computing means using a recursive estimator to model the dynamic behaviour of the system;
(e) fourth computing means for determining a quadratic approximation to the said sum of the log-likelihood function and the residual function, the fit being weighted in dependence upon the present uncertainty in the state of the dynamic system as evidenced by the output of the third computing means;
(f) fifth computing means for deriving from the said quadratic approximation parameters to serve as the basis for a measurement update within the third computing means;
(g) sixth computing means for subtracting the said quadratic approximation from the said sum of the log-likelihood function and the residual function which it approximates so as to form a new residual function;
(h) seventh computing means for transforming the said residual function to take into account dynamic change in the state of the system during the interval between successive measurements or sets of measurements in the said measurement sequence; and
(i) eighth computing means for determining whether the said quadratic approximation produced by said fourth computing means is suitable to serve as an input to said third computing means and being operative, if it is determined that the quadratic approximation is suitable for the aforesaid purpose, to activate the fifth and sixth computing means and otherwise to use as an input to the seventh computing means the sum of the log-likelihood function and the residual function, which sum is used as input to the fourth computing means and is taken as the new said residual function.

According to a second aspect of the invention an apparatus for measuring the state of a dynamic system comprises:
(a) sensing means for producing a sequence of measurements or sets of measurements which are dependent upon the current state of the said system in the presence of noise and other sources of error being sources which are representable by a statistical model;
(b) first computing means for determining a likelihood function associated with each of the said measurements or sets of measurements in accordance with the said statistical model;
(c) second computing means for obtaining the product of the said likelihood function and a residual function which is initially set to be identically unity;
(d) third computing means using a recursive estimator to model the dynamic behaviour of the system;
(e) fourth computing means for determining a Gaussian approximation to the said product of the likelihood function and the residual function, the fit being weighted in dependence upon the present uncertainty in the state of the dynamic system as evidenced by the output of the said third computing means;
(f) fifth computing means for deriving from the said Gaussian approximation parameters to serve as the basis for a measurement update within the third computing means;
(g) sixth computing means for dividing the said Gaussian approximation into the said product of the likelihood function and the residual function which it approximates so as to form a new residual function:
(h) seventh computing means for transforming the said residual function to take into account dynamic change in the state of the system during the interval between successive measurements or sets of measurements in the said measurement sequence; and
(i) eighth computing means for determining whether the said Gaussian approximation is suitable to serve as an input to said third computing means and being operative, if it is determined that the Gaussian approximation is suitable for the aforesaid purpose, to activate the fifth and sixth computing means and otherwise to use as an input to the seventh computing means the product of the likelihood function and the residual function, which product is used as input to the fourth computing means and is taken as the new said residual function.

The expression likelihood function (LF) is defined as follows. Suppose that a measurement procedure having as its outcome a random vector Y is characterised by a statistical model according to which the statistical distribution of y is given by a probability mass function $P_y$ (y; $x_1$, ... $x_n$), or by a probability density function $f_y$ (y; $x_1$, ... $x_n$), the distribution being subject to n(n≧1) unknown parameters $x_1$, ... $x_n$. Suppose that this measurement procedure is carried out and leads to the observed result $Y = y_0$. Then the likelihood function generated by the measurement $Y = y_0$ is the function of $x_1$, ... $x_n$ which results by substituting the observed value $y_0$ for the variable y in $P_y$ (y; $x_1$, ... $x_n$) or $f_y$ (y; $x_1$, ... $x_n$), as the case may be, and multiplying the result by an arbitrary constant.

The log-likelihood function is the natural logarithm of the likelihood function.

In one particular application of the first and second aspects of the invention the apparatus is used for constructing a terrain profile under an aircraft's track, said sensing means of said apparatus comprising a radio or laser altimeter, a barometric altimeter and a dead reckoning navigator.

According to a third aspect of the invention in a navigation system using a recursive estimator for navigation integration the parameters of a quadratic function approximating to a log-likelihood function are used as inputs to the estimator.

According to a fourth aspect of the invention in a navigation system using a recursive estimator for navigation integration the parameters of a Gaussian function approximating to a likelihood function are used as inputs to the estimator.

BRIEF DESCRIPTION OF THE DRAWINGS

The invention will now be further explained and embodiments of the invention described, by way of example, with reference to the accompanying drawings in which:

FIGS. 9A and 9B are diagrams illustrating one method of approximating a likelihood function as illustrated by FIG. 3 or FIG. 9 by a function of Gaussian Form.

DETAILED DESCRIPTION OF THE PREFERRED EMBODIMENTS

Figure 1:
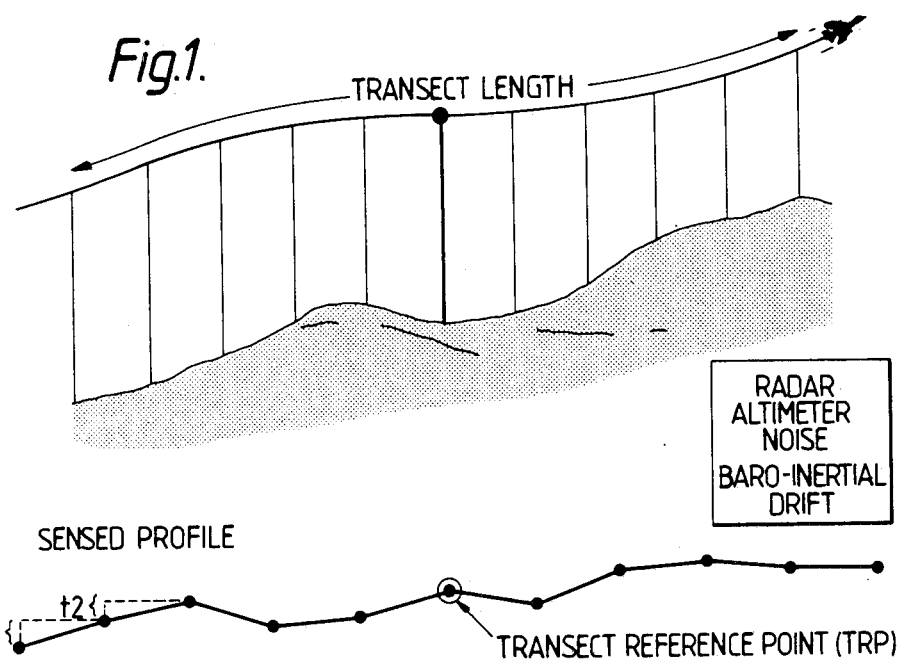
FIG. 1 is a diagram illustrating the basic concepts of terrain contour navigation (TCN) as applied to aircraft.

In this description we shall consider the application of Bayes' theorem to Terrain Contour Navigation (TCN). First, the relationship between Bayes' theorem and the Kalman filter will be explored, with particular emphasis on the concept of the likelihood function. The specification will then address the question as to how, when the observational information consists of a batch (transect) of TCN data, a suitable approximation to the likelihood function can be computed using a digital map. It is noted that, for transects of sufficient length, the likelihood function thus computed is usually approximately Gaussian in form. This leads directly to a straightforward and elegant implementation of TCN, called here Proto-SPARTAN, which can be interfaced directly to a Kalman filter for navigational integration.

The description goes on to consider the potential benefits that accrue from the use of shorter transects, yielding more frequent fixes, and highlights the problems that this entails. Two approaches to these problems are examined from a Bayesian point of view. The first approach processes radio altimeter measurements individually using an extended Kalman filter, on the assumption that the terrain in the vicinity of the aircraft can be approximated by a geometrical plane. The second approach employed in an implementation of TCN, called here SPARTAN, uses a technique of successive approximation to the likelihood function. It is argued that under circumstances favourable to the first approach, the two techniques are logically nearly equivalent, but that the second approach is capable of efficient and reliable operation over a wider range of conditions.

1. Introduction: Bayes' Theorem and the Kalman Filter

Bayes' theorem of probability theory was proposed by the Rev. Thomas Bayes in a paper published posthumously in 1763. Stated in terms of discrete events A and B, it states that the following relationship holds between the probability of B conditional upon A and the probability of A conditional on B:

$$p(B|A) = \frac{P(A|B) \, p(B)}{p(A)} \quad (1.1)$$

Restated in terms of probability densities, Bayes' theorem becomes $$f(x|y) = \frac{f(y|x) f(x)}{f(y)} \quad (1.2)$$

To take a concrete example, let the vector x represent the position of an aircraft, and the vector y represent the result of a statistical experiment whose outcome depends on the aircraft's position. Then f(x) will represent the probability density function for the aircraft's position prior to the experiment, and $f(y|x)$ gives the probability density function for the experimental outcome y given that the true aircraft position is x. The formula enables us to derive $f(x|y)$, the updated probability density function for x given that the experiment had a particular outcome y.

The fourth term of equation (1.2), f(y), is the unconditional probability of experimental outcome y, and can be obtained as $$f(y) = \int_x f(y|x) f(x) \, dx \quad (1.3)$$

where the integration extends over all possible positions x. It is best to think of f(y) as a normalising constant which ensures that $f(x|y)$ integrates to unity with respect to x. Note that f(y) depends on the experimental outcome y, but not on the true aircraft position.

Another way of expressing equation (1.2) is $$f(x|y) = c_y L_y(x) f(x) \quad (1.4)$$

Here $c_y$ is a normalising constant, while $L_y(x)$ is called the likelihood function for x generated by the observation y. $L_y(x)$ is identical to the conditional probability density $f(y|x)$ (apart from an optional arbitrary scaling constant), except that it is considered as a function of x with y as a parameter rather than the other way about.

An important special case of Bayes' theorem is described in the following theorem:

THEOREM 1

If f(x) is a multidimensional Gaussian distribution with mean $\mu_0$ and covariance matrix $P_0$, and $L_y(x)$ is of the form $$L_y(x) = c(y) \exp -\tfrac{1}{2}(x-\mu_y)^T J_y (x-\mu_y) \tag{1.5}$$

where the matrix $J_y$ is non-negative definite, i.e. the likelihood function is of multidimensional Gaussian form with 'mean' $\mu_y$ and 'information' matrix $J_y$, then the updated distribution of x, f(x|y), is a multidimensional Gaussian distribution with covariance matrix $$P_+ = (P_0^{-1} + J_y)^{-1} \tag{1.6}$$

and mean $$\begin{aligned} \mu_+ &= P_+(J_y\mu_y + P_0^{-1}\mu_0) \\ &= \mu_0 + P_+ J_y(\mu_y - \mu_0) \\ &= \mu_y + P_+ P_0^{-1}(\mu_0 - \mu_y) \end{aligned} \tag{1.7}$$

This theorem contains the essence of the Kalman filter measurement update. Notice that the theorem requires that the likelihood function be of Gaussian form, i.e. that f(y|x) be of Gaussian form when considered as a function of x. For this it is not in fact either necessary or sufficient that f(y|x) be of Gaussian form when considered as a function of y. However, in expositions of the Kalman filter it is common to make the stronger assumption that f(y|x) is of the form $$f(y|x) = k \exp -\tfrac{1}{2}(y-Cx)^T R^{-1}(y-Cx) \tag{1.8}$$

where C is a constant matrix of full rank (the 'measurement matrix') and k is a normalising constant, i.e. y has a Gaussian distribution with mean Cx and covariance matrix R. Considering f(y|x) as a function of x, it is straightforward to show that equation (1.8) is of Gaussian form with 'information' matrix $C^T R^{-1} C$, and 'mean' $C^- y$, where $C^-$ is a generalised inverse of C. In the terminology of Theorem 1, $$\begin{aligned} \mu_y &= C^- y \\ J_y &= C^T R^{-1} C \end{aligned} \tag{1.9}$$

Substituting these expressions in equation (1.6), we obtain the familiar Kalman filter equations $$\begin{aligned} P_+ &= (P_0^{-1} + C^T R^{-1} C)^{-1} \\ \mu_+ &= P_+(C^T R^{-1} y + P_0^{-1} \mu_0) \\ &= \mu_0 + P_+ C^T R^{-1}(y - C\mu_0) \end{aligned} \tag{1.10}$$

From a logical point of view, then, the equations (1.7) are more fundamental than the standard equations (1.10), equation (1.10) being the special case of equation (1.7) for measurements for which f(y|x) has the form of equation (1.8). Algebraically, however, equation (1.7) may be regarded as a special case of equation (1.10), as may be seen by setting C to be the identity matrix I.

2. Application of Bayes' Theorem to Terrain Contour Navigation

This section considers how Bayes' theorem can be applied to Terrain Contour Navigation (TCN). TCN is here used as a generic term for any technique of aided navigation which relies on comparing sensed terrain heights with those stored in a digital map. The term TCN is thus intended to embrace specific implementations such as TERCOM, SITAN, CAROTE, SPARTAN, TERPROM and so on.

At this point it will be appropriate to review the basic concepts of TCN as applied to aircraft, by reference to FIG. 1. Three types of measurement data are required. First of all, the technique requires a sequence of measurements of the ground clearance (i.e. height above ground level) of the aircraft. This is normally obtained by sampling the output of a radio or laser altimeter, possibly with some additional prefiltering; a horizontal sampling interval of about 100 meters is typical in practice, but this is not critical. Second, data from a barometric or baro-inertial height sensor are required to measure any vertical motion of the aircraft between successive ground clearance measurements. Third, some form of dead-reckoning system (e.g. an inertial system, or Doppler radar plus a heading reference) is required to measure the relative horizontal positions of the ground clearance measurements. The essence of TCN is to use these data to reconstruct the terrain profile under the aircraft's track. A digital map of terrain height is then searched to find a matching profile in the vicinity of the aircraft's position as previously estimated; this can then be used as the basis of an update to the estimated position.

There is no reason in principle why Bayes' theorem should not be applied directly to this problem. Taking the theorem in the form of equation (1.4) we have $$f(x|y) = c_y L_y(x) f(x) \tag{2.1}$$

Here $c_y$ is a normalising constant, f(x) is the probability density function for aircraft position prior to the TCN update, while f(x|y) is the density function after taking into account a set y of TCN measurement data as described above. (For the time being it is simplest to think of x as representing simply aircraft position. Later on it will be convenient instead to use x to represent the error in the position estimated by the dead-reckoning navigation system, or as a navigation system error vector of higher dimensionality).

The remaining term is the likelihood function:

$$L_y(x) = f(y|x) \tag{2.2}$$

To determine this, we need to answer the question: what is the probability of observing a set of terrain profile data y if the true aircraft position is x? This probability (or more strictly, probability density) is to be considered as a function of aircraft position x for a given batch of profile data y.

The remainder of this section will be concerned with illustrating ways in which a working approximation to the likelihood function (LF) can be computed in practice. There are a number of different approaches to this. One option is whether to take aircraft height into account explicitly in the computation of the LF, or to treat it as a nuisance parameter. Another option is whether to treat the ground clearance measurements individually, or in batches; this specification will generally treat the former approach as a special case of the latter (i.e. batches of one).

Figure 2:
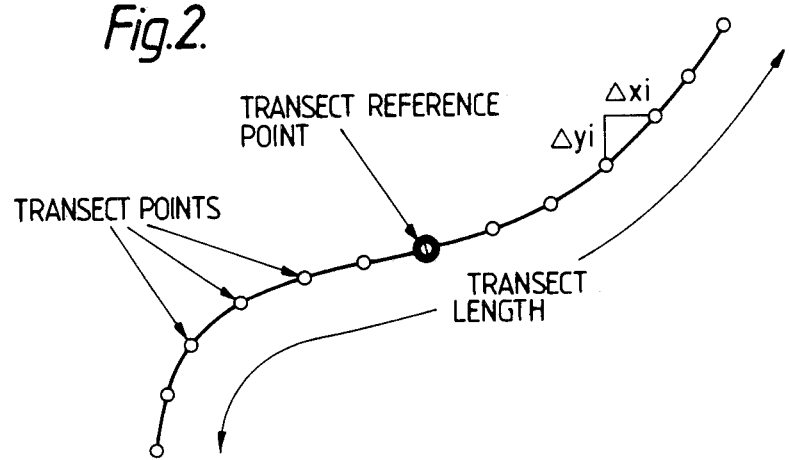
FIG. 2 is a diagram illustrating the terminology used for a batch (transect) of TCN data.

Some additional terminology will be useful at this point. Batches of successive terrain measurements which are treated together for the purpose of computing an LF will be referred to as transects. The individual ground clearance measurements comprised in a transect will be called transect points, and the along-track horizontal distance between the first and last points in a transect is called the transect length (see FIG. 2). One of the transct points is designated the transect reference point (TRP); the exact choice of TRP is a matter of convention, but it is advantageous to choose a point near the middle of the transect.

The question that the LF must answer can now be rephrased as: what would be the probability (density) for the observed transect data y if the true position of the aircraft at the time of the TRP had been x? In determining this the following sources of measurement error are relevant:

(1) errors in the measurement of ground clearance (radio altimeter errors), (2) offset and drift in the measurement of aircraft height above sea level (or other datum), (3) drift in the horizontal dead-reckoning error, leading to errors in determining the position of the other transect points with respect to the TRP.

These are sensor errors. In addition it is necessary to consider what is arguably a species of computation error, namely errors associated with the digital reference map. These are threefold:

(4) errors in the spot heights recorded in the digital map, (5) errors resulting from interpolation in the digital map, (6) errors due to ground cover.

Additional error sources must be taken into account if the terrain measurements are taken from high altitude, and/or using a narrow beam ground clearance sensor. It is not, however, the intention here to discuss these error sources in detail, but merely to illustrate how models for such errors can be accommodated in the calculation of the LF. This will be done using two simple examples.

EXAMPLE 1

Figure 3:
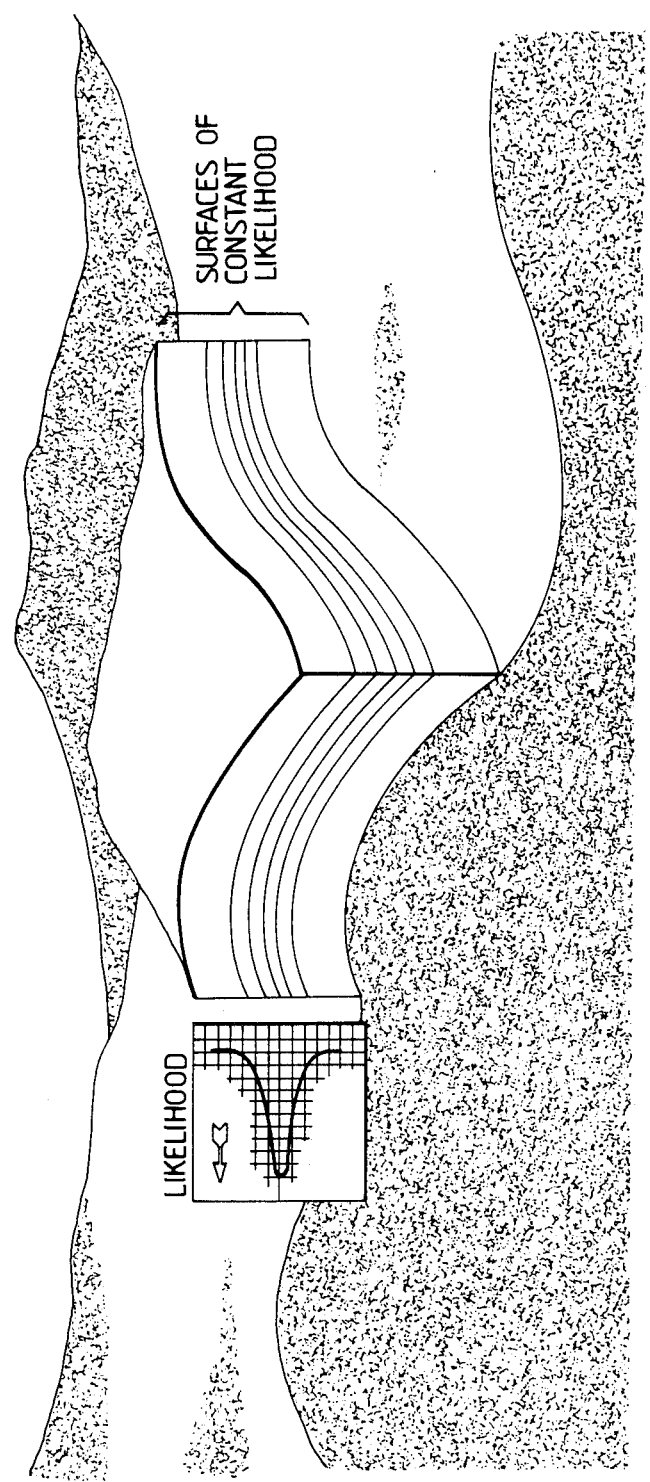
FIG. 3 is a diagram illustrating a likelihood function (LF) for a short transect, i.e. consisting a single point.

In this example we shall consider transects consisting of a single transect point (i.e. the ground clearance measurements are processed individually), and treat aircraft height as an explicit unknown. In the case of a single-point transect, error sources (2) and (3) will not be relevant to the computation of the LF itself (although they will be relevant to the propagation of estimated aircraft position between one transect and the next). We will assume that the remaining error sources can be jointly modelled by a simple Gaussian model as follows: Let the terrain surface obtained by interpolation in the digital map be represented by the function m(x, y). Then, if the true aircraft position at the moment of the ground clearance measurement is (x, y, z), the measured ground clearance s will differ from its predicted value (z−m(x, y)), partly due to radio altimeter errors, (1), and partly due to map errors, (4), (5) and (6). The model to be adopted in this example assumes that this difference is distributed in a Gaussian distribution with mean zero and standard deviation $\sigma$, and that the errors for different ground clearance measurements are statistically independent. This model leads directly to the following equation for the LF:

$$L_y(x) = \frac{1}{\sigma\sqrt{2\pi}} \exp -\frac{1}{2\sigma^2} \{s - z + m(x, y)\}^2 \quad (2.3)$$

where x = (x, y, z) and the measurement y comprises the single ground clearance measurement s. The LF is thus a function of three variables, and the surfaces of constant likelihood run parallel to the terrain as illustrated in FIG. 3.

EXAMPLE 2

In this example we consider a transect of n points (n > 1), and treat aircraft height as a nuisance factor.

For each transect point i, i = 1, . . . n, let the measured aircraft altitude be $a_i$, the measured ground clearance be $s_i$, and let $\Delta x_i$, $\Delta y_i$ be the lateral offsets (FIG. 2) of the transect point from the transect reference point, as measured by the dead-reckoning system.

For the purpose of this example, drift in the horizontal dead-reckoning error during the course of a transect will be assumed to be negligible, so that the measured $\Delta x_i$ and $\Delta y_i$ can be taken to be exact. Likewise, drift in the measurement of aircraft height will be assumed to be negligible during a transect: it will simply be assumed that the $a_i$ are in error by an unknown amount c, constant throughout the transect (QNH error). It will further be assumed that radio altimeter and digital map errors can be modelled as in Example 1, i.e. they jointly result in a random Gaussian error with standard deviation $\sigma$. Suppose that the true horizontal aircraft position at the TRP is (x, y); the true aircraft position at transect point i will therefore be $(x+\Delta x_i, y+\Delta y_i)$. This yields a 'map profile' given by the sequence of heights $$m_i = m(x + \Delta x_i, y + \Delta y_i) \text{ for } i = 1, \ldots n \quad (2.4)$$

On the other hand, we have a 'sensed profile' given by $$t_i = h_i - s_i \text{ for } i = 1, \ldots n \quad (2.5)$$

Consider first the discrepancies $$d_i = t_i - m_i \text{ for } i = 1, \ldots n \quad (2.6)$$

From the preceding discussion, it is evident that these discrepancies can be represented as $$d_i = c + n_i \quad (2.7)$$

where c is the QNH error, and the $n_i$ are independent random Gaussian variables of mean zero and standard deviation $\sigma$, representing radio altimeter and map noise. To eliminate the unknown constant c, we form the first differences $t'_i$ and $m'_i$:

$$t'_i = t_{i+1} - t_i \quad (2.8)$$
$$m'_i = m_{i+1} - m_i$$

In other words, instead of considering the discrepancies between the sensed and map profiles in respect of individual terrain heights, we consider instead the discrepancies in changes of terrain height along the profile. From equation (2.7) we get $$t'_i - m'_i = d_{i+1} - d_i = n_{i+1} - n_i \quad (2.9)$$

-continued i.e. $t'_i = n_{i+1} - n_i + m'_i$

Thus the $t'_i$ are independent of c, and their joint probability distribution can easily be determined. Since the $t'_i$ are linear combinations of Gaussian quantities, the $t'_i$ are themselves Gaussian, with mean $$E(t'_i) = E(n_{i+1}) - E(n_i) + E(m'_i) = m'_i \quad (2.10)$$

and covariances $$E(t'_i - m'_i)(t'_j - m'_j) \quad (2.11)$$

$$= E(n_{i+1}n_{j+1}) - E(n_{i+1}n_j) - E(n_in_{j+1}) + E(n_in_j)$$

$$= \begin{cases} 2\sigma^2 & \text{for } i = j \\ \sigma^2 & \text{for } |i - j| = 1 \\ 0 & \text{otherwise} \end{cases}$$

Hence the probability density function for the vector $t' = (t'_1, \ldots t'_{n-1})$ is given by the formula:

$$f(t') = \frac{1}{\sqrt{(2\pi)^{n-1}|\Sigma|}} \exp\left(\tfrac{1}{2}(t' - m')^T \Sigma^{-1}(t' - m')\right) \quad (2.12)$$

where $m' = (m'_1, \ldots m'_{n-1})$ and $\Sigma$ is the covariance matrix given by equation (2.11), i.e.

$$\Sigma = \sigma^2 \begin{bmatrix} 2 & -1 & & & & & \\ -1 & 2 & -1 & & & & \\ & -1 & 2 & -1 & & & \\ & & \cdot & \cdot & \cdot & & \\ & & & \cdot & \cdot & \cdot & \\ & - & & & -1 & 2 & -1 \\ & & & & & -1 & 2 & -1 \\ & & & & & & -1 & 2 \end{bmatrix} \quad (2.13)$$

Equation (2.12) gives the probability of observing the sensed profile t' if the true aircraft position at the transect reference point were (x,y). The LF can be obtained directly by considering this to be a function of (x, y). It is also permissible at this stage to apply (or remove) a constant scale factor, since the effect of this will be negated in any case by the normalising constant $c_y$ in equation (1.4). This we have:

$$L(x, y) = \exp -\tfrac{1}{2}(t' - m')^T \Sigma^{-1}(t' - m') \quad (2.14)$$

For many purposes it is simpler to consider the natural logarithm of the likelihood, or log-likelihood, i.e.

$$\ln L = \tfrac{1}{2}(t' - m')^T \Sigma^{-1}(t' - m') \quad (2.15)$$

The LF computed in this way is thus a function of only two variables. The method of the second example can readily be modified to accommodate drift in the vertical navigation channel, and this has been found advantageous in some applications. The method can also be extended to allow for horizontal channel drift (i.e. velocity errors).

3. A Practical Implementation (Proto-SPARTAN)

The primary problem of terrain contour navigation is to estimate the errors in an aircraft's (or other vehicle's) dead-reckoning navigation system using the terrain data yielded by a TCN transect of one or more points.

The previous section considered applying Bayes' Theorem, Equation (1.4), directly to this problem, given a suitable approximation to the likelihood function. An implementation of this could take position error as the unknown, and work with a two-dimensional array giving the probabilities (or strictly, probability densities) for possible position errors. At each fix, the array would be updated using Equation (1.4), whilst between fixes the array would be updated in accordance with a model of the error propagation in the dead-reckoning system.

In practice this 'ideal Bayesian TCN' has a number of drawbacks, but it is useful to keep it in mind as a touchstone for assaying practical techniques.

The primary drawback with 'ideal TCN' is the amount of computation involved, both in the 'measurement update' following a fix and the 'time update' between fixes. This is especially so if the error propagation of the dead-reckoning system is described by a differential equation of high order, as may well be the case with an inertial navigation system. In this case it is not sufficient for the array of probabilities to extend over the two dimensions of position error: it must extend over the n dimensions of the system state vector, entailing a formidable increase in the array's size. A secondary drawback, no doubt surmountable, is that the 'output' of the 'ideal' system will be an array of probabilities, which is likely to be too complicated as an input to other systems requiring navigational data. These other systems will rather be looking for input in 'mean and standard deviation' format.

The by now classical technique for performing 'time updates' and 'measurement updates' of a system state estimate is of course the Kalman filter, which is computationally manageable and give answers in the desired form. However, as we saw in Section 1, the Kalman filter assumes that the likelihood function generated by each measurement is of Gaussian form. Is it possible, then, to apply the Kalman filter to TCN updating?

Figure 4:
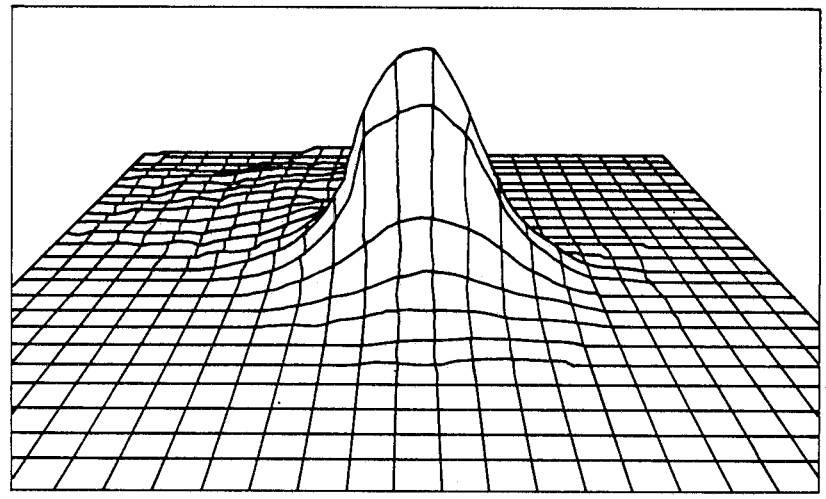
FIG. 4 is a diagram illustrating an LF for a long transect, i.e. a transect of sixty-one points.

Fortunately, experience shows that when the likelihood function is computed along the lines described in Section 2, then for transects of more than about 3 km, the likelihood function is consistently of roughly Gaussian form. This is illustrated in FIG. 4 which shows the LF for a transect of 61 points, approximately 6 km long, the function being computed in a manner similar to that of Example 2 in Section 2.

(There are in any case theoretical reasons for supposing that the LF will be approximately Gaussian in the vicinity of its peak, provided that the underlying error processes are approximately Gaussian and that the terrain surface is reasonably continuous.)

Figure 5:
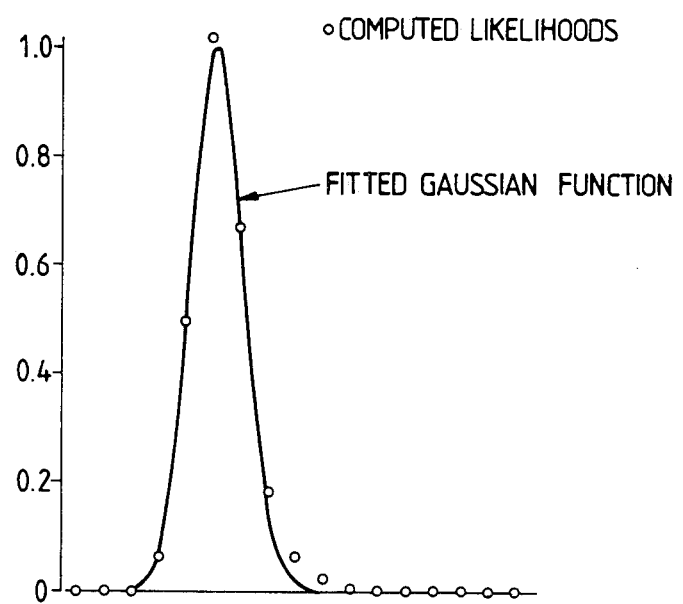
FIG. 5 is a graph illustrating a section of a computed LF for a sample transect.

This observation is the basis for the implementation of terrain contour navigation, called here Proto-SPARTAN, from which the SPARTAN technique has been evolved. In outline, the procedure for each Proton-SPARTAN fix is as follows. First, a grid of likelihood values is computed, the dimensions of the grid being determined by the prior position uncertainty. A function of Gaussian form is then fitted to the grid likelihoods, and this is subjected to two checks: (a) The peak value of the fitted LF is checked to ensure that it is consistent with a real match of profiles under the assumed sources of error. (b) The differences between the grid likelihoods and the fitted Gaussian function are evaluated to check goodness-of-fit. If either of these checks fails, the fix is rejected; otherwise the necessary parameters of the Gaussian function ($\mu_y$ and $J_y$ of equation (1.5)) are extracted and fed across to the Kalman filter. FIG. 5 shows a section of the computed LF for a sample transect together with its approximating Gaussian function.

In implementation, the Proto-SPARTAN technique differs slightly from the above account in that it works primarily in terms of the log-likelihood function—the natural logarithm of the LF—and operates by fitting a quadratic to the computed log-likelihoods. However, the fitting is done in such a way as to obtain a good match between the corresponding likelihood functions, so the procedure is logically equivalent to that described in the previous paragraph. In the SPARTAN technique introduced later, the log-likelihood function also plays an important role.

4. Potential Advantages of Short Transects

The Proto-SPARTAN technique produces position updates which are based on terrain data gathered over a short but not insignificant period of time, perhaps 30 to 60 seconds. Consequently, the estimate of position error provided by a fix is based on a weighted average of the position error over this period of time, the weighting depending on the terrain covered by the transect. In practice, the fix is taken to be an estimate of the position error at a single moment, about midway along the transect (the transect reference point). This assumption has been extensively validated by comparing the true (photofix) position at the transect reference point with the position according to Proto-SPARTAN. From these flight trails analyses it would appear that Proto-SPARTAN is capable of consistently giving good fixes. However, although each fix can thus be regarded as relating to the aircraft's position at mid-transect, the fix does not actually become available until the end of the transect, plus a further delay for computation. There is thus a total lag of at least 15 seconds between the arrival of a fix and the moment to which the fix relates. It is straightforward enough to adjust the Kalman filter to take account of this delay, but the lag can nevertheless be an important limiting factor in the system's real-time navigational performance.

Figure 6A:
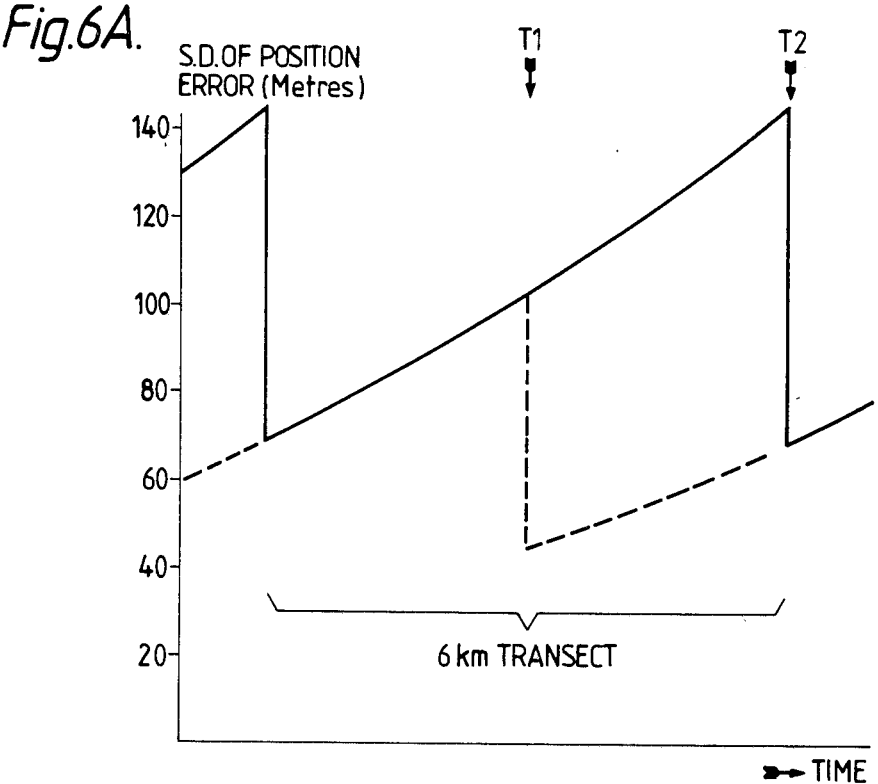
FIGS. 6A and 6B are graphs illustrating respectively for long and short transects the variation with time of the standard deviation of a component of position error in a navigation system having low grade dead reckoning performance.

The point is illustrated in FIG. 6A. This shows the standard deviation of one component of position error plotted against time, for a simple idealised navigation system. The figure shows the steady state condition when the system is updated every minute by a TCN fix for which the corresponding component of position error is 50 meters (1 sigma).

$T_1$ marks a transect reference point. If the fix were available at the transect reference point to which it relates, the position error would follow the dashed line, and thus execute a saw-tooth variation between 45 meters and 103 meters standard deviation. In fact, however, the fix is not available until $T_2$ at the earliest, so that actual error propagation is shown by the solid line, with a saw-tooth variation between 69 meters and 145 meters standard deviation.

Figure 7A:
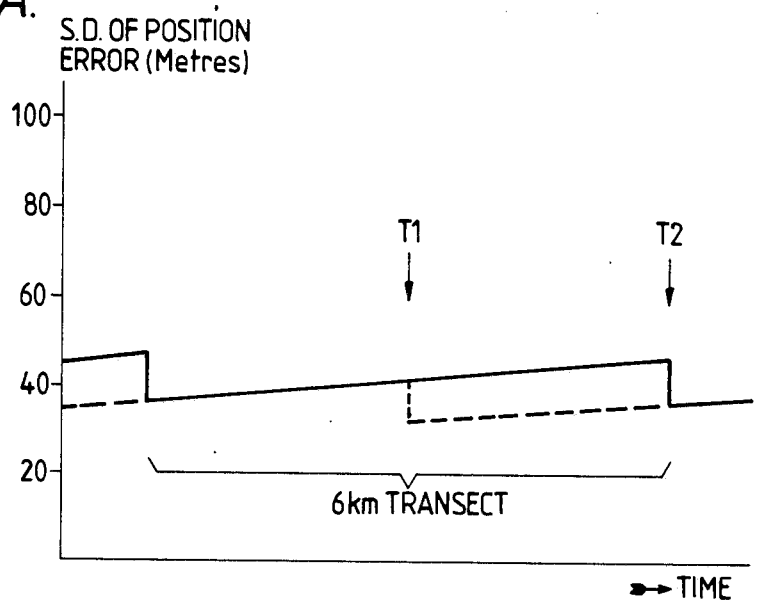
FIGS. 7A and 7B are graphs corresponding to the graphs of FIGS. 6A and 6B respectively but for a navigation system having high grade dead reckoning performance.

Clearly the saw-tooth effect will be less pronounced with a better dead-reckoning system; the system shown in FIG. 6A has a dead-reckoning performance of about 10 km/hr. FIG. 7A shows the corresponding results for a system of 1 km/hr performance, and this suggests that the Proto-SPARTAN technique should be quite satisfactory for use in a manned combat aircraft, where a good inertial navigation system is usually mandatory in any case. In many applications, however, it will be desirable to economise severely on the dead-reckoning instruments, and rely on continual TCN fixing to maintain navigational performance. In such applications, a large saw-tooth fluctuation between fixes could severely limit the economies that can be made within the mission requirements.

The obvious solution is to use shorter transects. Suppose for example that we break each 60-second transect into 10 transects of 6 seconds. If the terrain information is uniformly distributed in time, then each of the new transects will contain one-tenth of the information in the original fix, so we could expect the variance of the new fixes to be ten times that of the old, giving a standard deviation of $50 \times \sqrt{10} = 158$ meters.

Figure 6B:
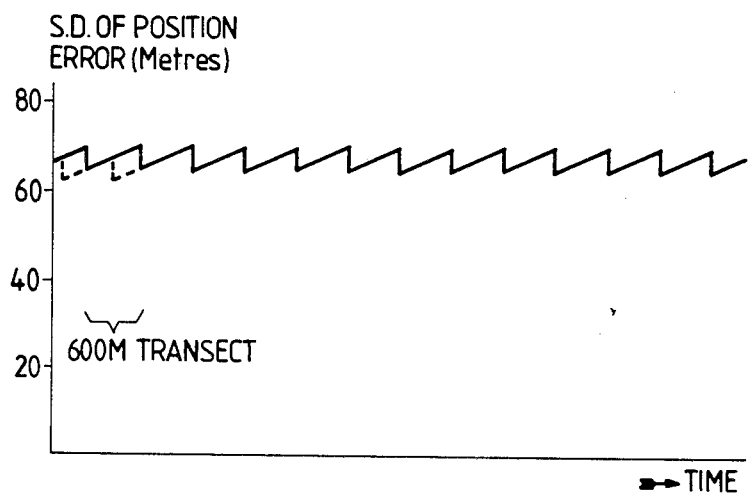

If we now plot the position error propagation of the same dead-reckoning system as in FIG. 6A, but with 6 second transects, we obtain FIG. 6B. The position error now has a saw-tooth fluctuation between 65 meters standard deviation and 70 meters standard deviation, a great improvement in system terms.

Figure 7B:
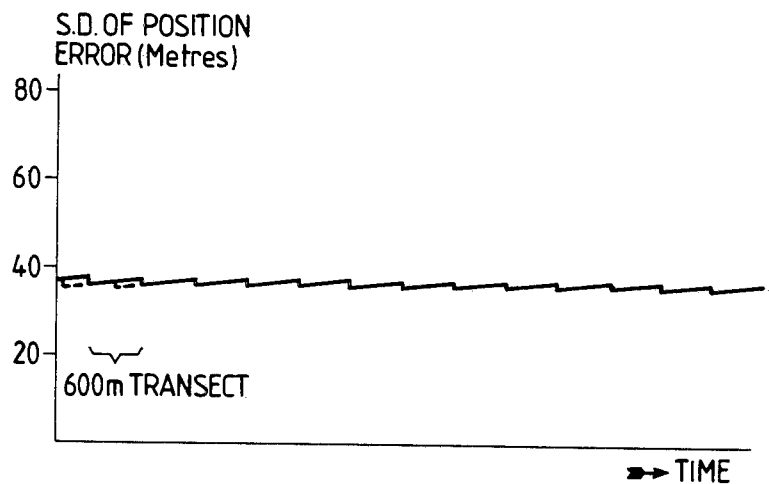

FIG. 7B shows the corresponding result for the high grade dead-reckoning system. It will be seen that the performance improvement in this case is only marginal.

5. The Problems of Short Transects

The previous section suggests that it is desirable to use transects as short as possible. But this is so only if it is possible to process the information in a short transect as efficiently as is possible for a long transect. In particular, it was assumed that the fix error would, other things being equal, vary approximately as the inverse square root of the transect length, and it is now appropriate to look more closely at the basis of this assumption.

As foretokened in Section 2, we shall at this point cease to regard the likelihood function as a function of the position error in the aircraft's dead-reckoning (DR) system. This change of variable will mean that we can regard the LFs generated by successive transects as relating to virtually the same unknown quantity.

It follows from the definition of the likelihood function that the LF generated jointly by a group of statistically independent measurements will equal the product of the LFs generated by the individual measurements; this is because the joint probability density function will equal the product of the marginal density functions. Consequently, if a consecutive sequence of short transects is consolidated to form a single long transect, the LF generated by this long transect will be approximately equal to the product of the LFs generated by the short transects. (Only approximately because of minor statistical dependencies between the short transects, and because the position error varies slightly from one short transect to the next.)

In particular, if the n short transects were to generate LFs of the Gaussian form $$L_i(x) = \exp - \tfrac{1}{2} (x_i - \mu_i)^T J_i (x_i - \mu_i) \qquad (5.1)$$

for $i = 1, \ldots n$ corresponding to Equation (1.5), then the consolidated long transect would generate an LF of similar form $$L(x) = \exp -\tfrac{1}{2}(x-\mu)^T J(x-\mu) \qquad (5.2)$$

where $$J = \sum_{i=1}^{n} J_i \qquad (5.3)$$

In the special case where $J_i$ are all equal, we have $$J = nJ_i \qquad (5.4)$$

In other words, the dispersion of the LF (given by the inverse of the 'information' matrix J and thus corresponding to variance) will be inversely proportional to transect length.

Figure 8:
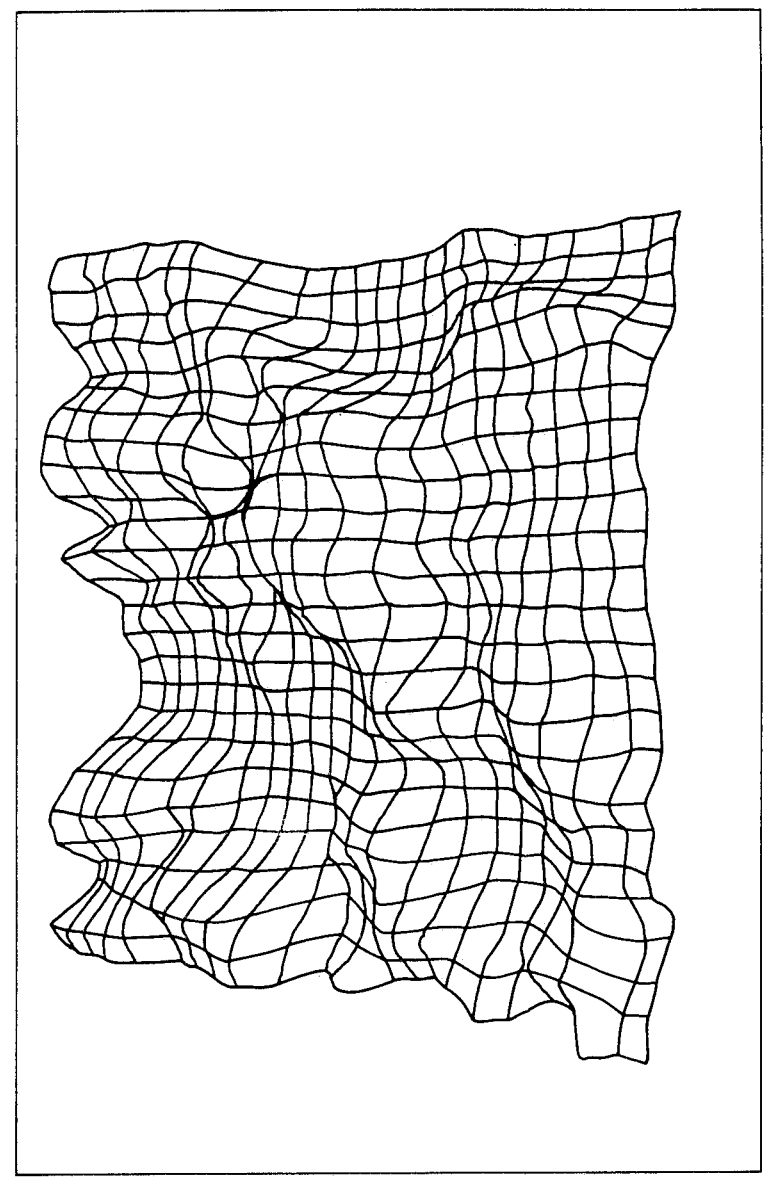
FIG. 8 is a diagram illustrating a likelihood function for a short transect.

As we saw in Section 3, the LF generated by sufficiently long transects is of approximately Gaussian form. Unfortunately, this is not true for short transects, as FIGS. 3 and 8 illustrate. It remains true, however, that the long transect LF will approximately equal the product of the short transect LFs, and if the short transect data were processed by the 'ideal Bayesian' method considered at the start of Section 3, there would be no problem, and the potential advantages of short transects brought out in Section 4 would be realised. But, as Section 3 went on to argue, this ideal Bayesian mechanisation is impractical, and we are forced instead to look to mechanisations based on, for example, the Kalman filter. It is a prerequisite to the use of the Kalman filter that the LF is approximated by a function of Gaussian form. It is this approximation which causes the problems: (a) How should it be done? and (b) Does it preserve the property expressed by Equation (5.3), or does it result in a more rapid deterioration in effective fix accuracy with shorter transect length?—in which case the potential advantages of shorter transects will not be fully realised.

Figure 9B:
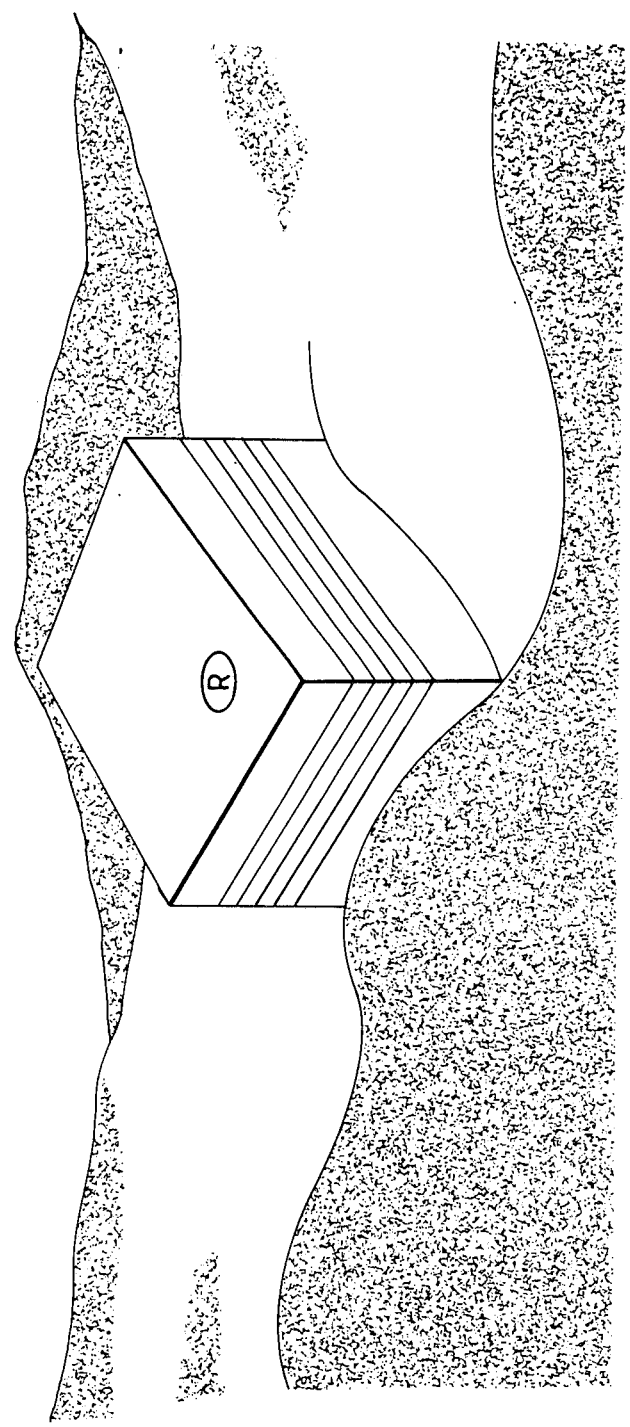

How can a likelihood function such as those in FIGS. 3 and 8 be satisfactorily approximated by a function of Gaussian form? One method is illustrated in FIG. 9A. If the aircraft is previously known to be within a small region such as R, then often the LF will be nearly Gaussian within that small region, and it can be approximated accordingly, as shown in FIG. 9B. This lies at the root of implementations of TCN such as SITAN and TERPROM, though these are usually expressed in terms of linearising the terrain (i.e. approximating the terrain within R by a geometrical plane) rather than approximating the LF by a Gaussian function, but as is apparent from the figures it amounts to the same thing.

To be valid, this approach needs an accurate initial estimate of the aircraft position, and this is usually established using a long-transect terrain-contour fix. Also, a possible problem rises if there are local errors in the digital map, a very real possibility in practice. The local map error wil lead to an incorrect plane approximation, which will lead to an erroneous correction to the position estimate. The resulting erroneous position estimate will mean that, for the next radio altimeter sample, the plane approximation is based on the wrong part of the digital map, and (even though the map may here be accurate) may well lead to a further erroneous position correction, and so on. Obviously one must expect some deterioration in navigational performance in the presence of local map errors, but one should at least aim to make the impact of these errors temporary, rather than leading to a domino effect.

Techniques of this kind generally incorporate additional measures with a view to relaxing the assumption that the terrain is approximately linear within the zone of position uncertainty. This is a significant step, for while the theory behind the so-called extended Kalman filter justifies the use of Kalman techniques to deal with non-linear systems in cases where the system equations can be approximated by linear equations within a region of uncertainty about a nominal trajectory in the state space, we are now contemplating applying the technique in cases where the system is patently non-linear within the uncertainty region.

The method generally adopted is to allow for the non-linearity of the terrain by assuming a higher level of measurement noise. As Hostetler and Beckmann put it in an article appearing at pages 1263 to 1270 of the Proceedings of the IEEE National Aerospace and Electronics Conference, 1978, "A non-linearity parameter is calculated describing how accurately the terrain beneath the system can be approximated by stochastic linearization in the Kalman filter. This approximation error is treated as additional measurement uncertainty during the calculation of the Kalman gain matrix, thus modulating the gains when the linear approximation is poor". A further discussion of this approach appears in an article by Andreas, Hostetler and Beckmann appearing at pages 1023 to 1030 of the Proceedings of the IEEE National Aerospace and Electronics Conference 1979.

It is evident in qualitative terms that this approach is appropriate, in that it causes the Kalman filter to give less weight to updates from non-linear terrain. Moreover, it can be justified in theoretical terms, and the literature indicates that it works in practice. However, the essence of the approach is to ignore some of the information at our disposal. The digital map records in detail the non-linearities in the terrain. The technique we are discussing disregards these details and pretends, as it were, that the map shows a locally planar piece of terrain, but that there is an additional noise source ('linearisation noise') which leads to deviations of the observed terrain height from this geometrical plane.

It should be noted that there is no analogue to this linearisation noise in long-transect methods such as that described in Section 3, which uses the digital map data directly in its full detail. Consequently, the use of short transects has incurred a price which must be offset against the advantages promised by Section 4.

6. Redistributing Log-likelihoods

Suppose that a number of independent statistical measurements are made of a particular non-varying unknown quantity. By statistical measurements we mean simply observations of data whose probability distribution depends on the unknown quantity in question. Then there are a number of different ways we could use Bayes' theorem to update out knowledge of the unknown quantity. We could derive a likelihood function for each observation separately and apply Bayes' theorem repeatedly. Alternatively we could lump all the observations together, derive a single LF for them jointly, and apply Bayes' theorem once. Again, we could group the observations into intermediately sized sub-batches, and derive a LF for each sub-batch. Whichever way we do it, the end result will obviously be the same. This is because, in each case, the product of the LFs is the same—or, equivalently, the sum of the log-likelihood functions used is in each case the same.

We can go further than this. Suppose, in the course of applying Bayee's theorem to this problem it were computationally convenient to approximate the individual LFs. This will make no difference to the end result provided the sum of the logarithms of the approximating function is equal to the sum of the original log-likelihood functions. In othe words, so far as the end result is concerned, it is legitimate computationally to redistribute log-likelihood (in an additive manner) between on sub-batch of measurements and another, provided the overall sum is preserved.

This possibility is fundamental to the SPARTAN implementation of TCN. In this case, the unknown in question is the position error in a navigation system, and the sub-batches of measurements are the short transects. Like Proto-SPARTAN, SPARTAN operates by fitting a quadratic to the log-LF derived from the transect data. The new feature is that the residual function, the difference between the computed log-likelihoods and the fitted quadratic, is no longer discarded, but is redistributed forward to be considered in conjunction with the data from the next transect; this residual function, commonly referred to as the stockpot function, can be thought of as representing information which has been gleaned from the terrain data but which has not yet been passed across to the Kalman filter. The fact that the likelihood functions generated by long transects are generally of Gaussian form to a good approximation suggests that this residual function will not grow in an unacceptable, unstable manner as increasing numbers of short transects are processed, and this is confirmed in practice.

7. The SPARTAN Technique

The SPARTAN technique utilises the ideas of the previous section to achieve a radically different solution to the problem of short transects. One limitation, however, of the exposition in Section 6 is that position error is treated as a non-varying unknown. Fortunately, the approach can be generalised by transforming the residual or stockpot function to allow for the dynamics of the navigation system errors.

Figure 10:
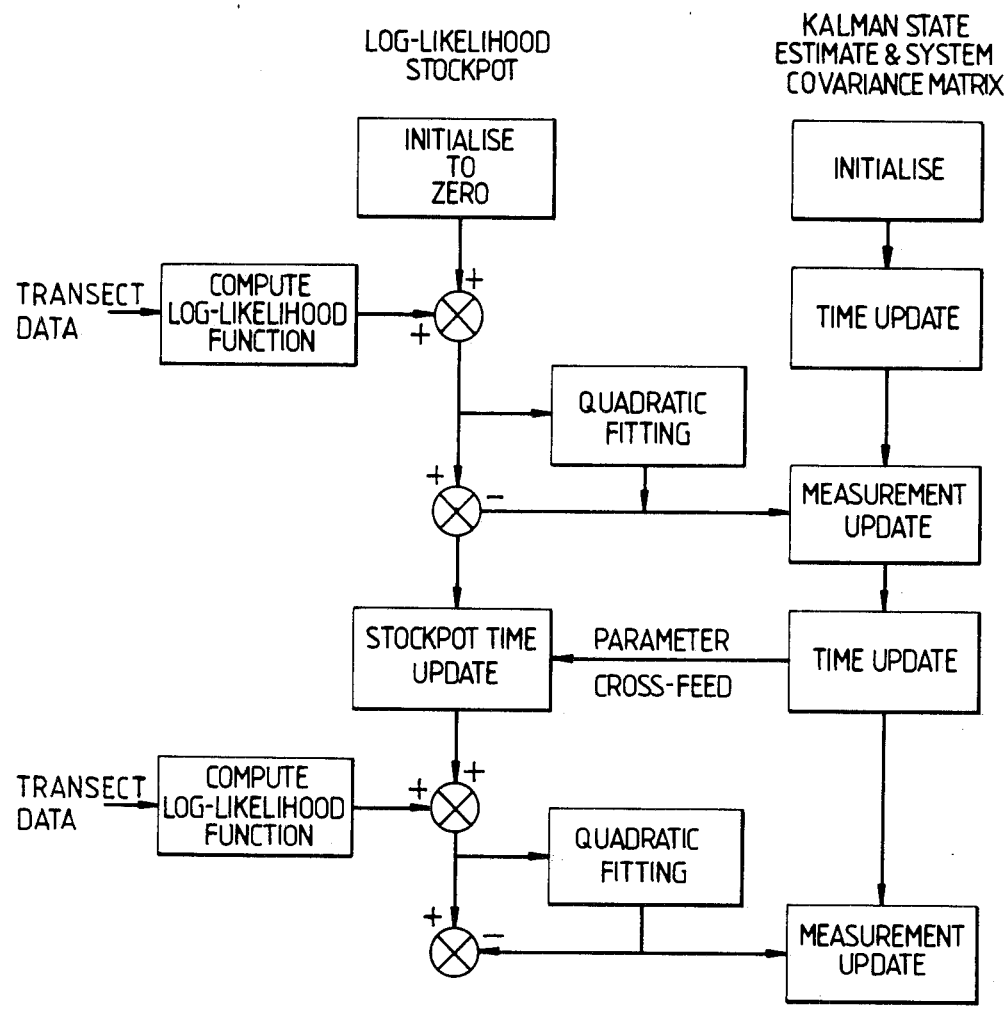
FIG. 10 is a flow diagram illustrating the sequence of steps performed by an apparatus according to the invention.

The resulting procedure operates by iterating through the following steps, as illustrated in FIG. 10.

1. A function of two variables (representing the horizontal components of DR position error), referred to as the stockpot function, is initialised to be identically zero.
2. When data for a transect becomes available, the system calculates the log-likelihood function for this data, over a search area determined by the current position uncertainty as estimated by the Kalman filter.
3. The log-likelihood function is added into the stockpot function.
4. The system now fits a quadratic surface to the sum of the stockpot function and the log-likelihood function.
5. The appropriate parameters of the quadratic are extracted and used to perform a measurement update in the Kalman filter.
6. The quadratic function is subtracted from the sum of the stockpot function and the log-likelihood, the remainder becoming a new stockpot function.
7. The new stockpot function is held over until new transect data becomes available, but in the meantime it is transformed to allow for the time variation of the navigation sytem errors. The parameters defining this 'time update' of the stockpot function are determined by the software routine for the Kalman filter time update, which will also be operating at this time.
8. The procedure now continues from step 2, and this loop is repeated indefinitely. Steps 5 and 6 are only carried out if the quadratic surface found in step 4 is convex above, i.e. dome-shaped. If this is not the case, no measurement is fed to the Kalman filter, and the procedure continues from step 7.

Figure 11:
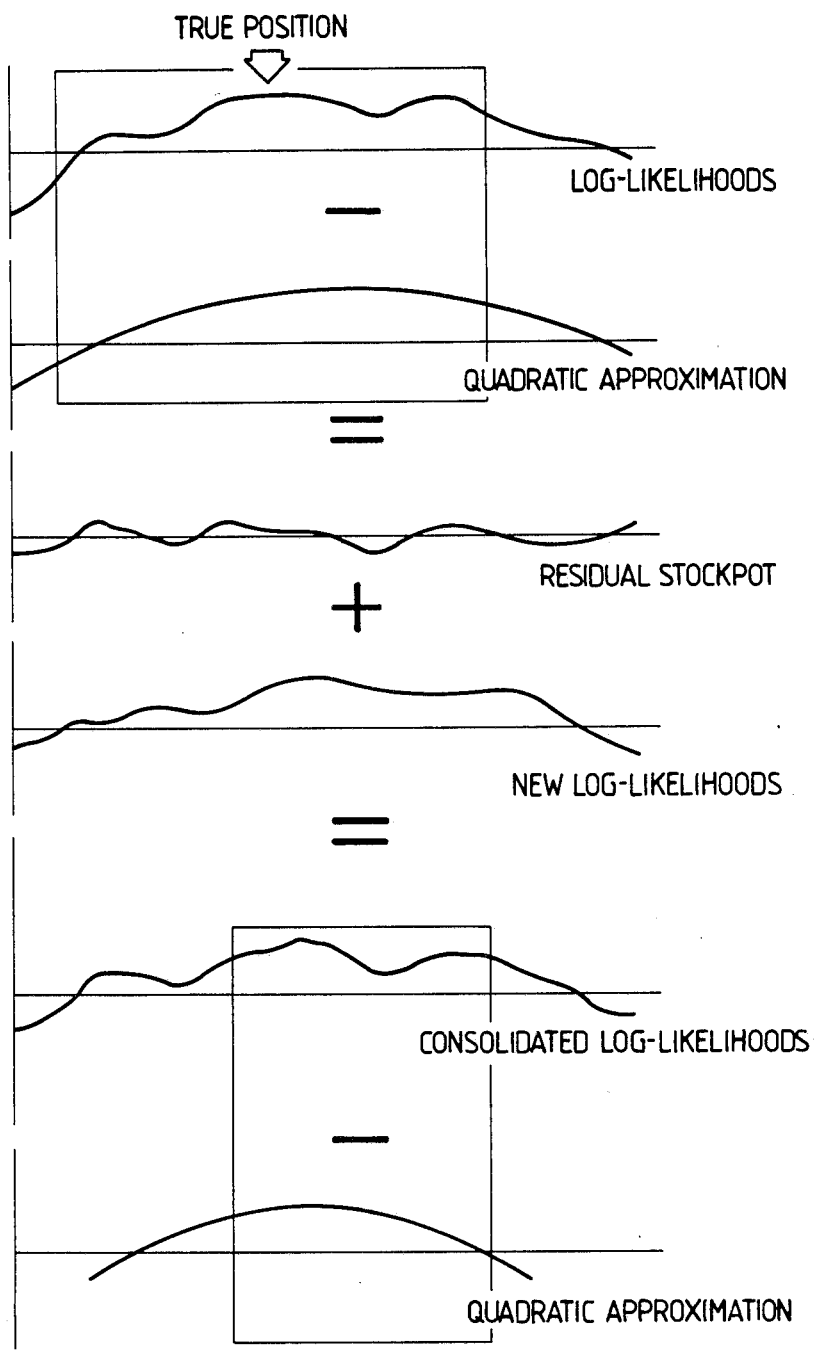

The quadratic approximation in step 4 is carried out in an adaptive manner, depending upon the position uncertainty at the time. This is of enormous benefit during initial capture from a high position uncertainty, as is illustrated schematically in FIG. 11. As we have seen, the log-likelihood function generated by a short transect is characterised by numerous local peaks. With a high position uncertainty, the system will fit a broad-based quadratic approximation, which will typically be very wide-domed. As far as the Kalman filter is concerned, this will give rise to a highly conservative fix, serving at most to eliminate a few areas where the log-likelihood is consistently low, but without any attempt at this stage to arbitrate between the multiple peaks.

However, the fine structure of the log-likelihood function from the first transect (Transect 1) is preserved in the stockpot function, and is reconsidered in conjunction with the log likelihood function derived from Transect 2. The peak in the log-LF from Transect 1 corresponding to the true aircraft position will normally be reinforced by a peak in Transect 2's log-LF, whereas other peaks will be reinforced or cancelled at random. This reinforcement, combined with the slightly reduced position uncertainty from the Kalman filter following the previous fix, will result in a slightly narrower-domed quadratic approximation, i.e. a slightly more confident second fix for the Kalman filter.

Once again the fine structure of the combined log-LFs is carried forward in the stockpot, and again the local peak corresponding to true aircraft position will tend to be reinforced by a similar peak in the log-LF from Transect 3. By repetition of this process, the system can cause the zone of position uncertainty to converge rapidly onto the true position. This will happen as soon as sufficient terrain data is acquired.

Figure 12:
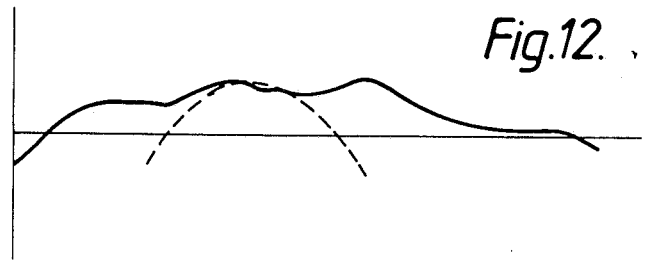
FIGS. 11 and 12 are diagrams further illustrating the operation of the apparatus.

When the system has settled, with a position uncertainty consistently of a few tens of meters, it will be found that the log-LFs are usually very nearly quadratic within the zone of position uncertainty, as illustrated in FIG. 12. In this case the residuals carried forward in the stockpot function are nearly zero. Under these circumstances the operation of SPARTAN will be closely equivalent to that of implementations such as SITAN.

If a localised map error is encountered, the system may be misled. However, the true aircraft position will reappear as an off-centre peak in the log-LF, and this will be reinforced—via the stockpot—from transect to transect. There is consequently a good chance that the system will recapture accurate navigation automatically. (A safety net of detection and recovery procedures for algorithm failures is also provided, but seldom activated; these procedures cost much more in elapsed time than automatic recovery normally takes.)

Although this section has described the SPARTAN procedure in terms of repeated quadratic approximation of the log-likelihood function, it will be appreciated that the technique could in principle equally be implemented by means of Gaussian approximations to the likelihood function, making the appropriate substitutions of multiplication for addition, division for subtraction and unity for zero.

It will be appreciated that an apparatus according to the invention, apart from the sensors which can be of any convenient known form, will comprise a digital computer controlled by appropriate software.

I claim:

1. An apparatus for measuring the state of a dynamic system comprising:
   (a) sensing means for producing a sequence of measurements or sets of measurements which are dependent upon the current state of the said system in the presence of noise and other sources of error being sources which are representable by a statistical model;
   (b) first computing means for determining a log-likelihood function associated with each of the said measurements or sets of measurements in accordance with the said statistical model;
   (c) second computing means for obtaining the sum of said log-likelihood function and a residual function which is initially set to be identically zero;
   (d) third computing means using a recursive estimator to model the dynamic behaviour of the system;
   (e) fourth computing means for determining a quadratic approximation to the said sum of the log-likelihood function and the residual function, the fit being weighted in dependence upon the present uncertainty in the state of the dynamic system as evidenced by the output of the third computing means;
   (f) fifth computing means for deriving from the said quadratic approximation parameters to serve as the basis for a measurement update within the third computing means;
   (g) sixth computing means for subtracting the said quadratic approximation from the said sum of the log-likelihood function and the residual function which it approximates so as to form a new residual function;
   (h) seventh computing means for transforming the said residual function to take into account dynamic change in the state of the system during the interval between successive measurements or sets of measurements in the said measurement sequence; and
   (i) eighth computing means for determining whether the said quadratic approximation produced by said fourth computing means is suitable to serve as an input to said third computing means and being operative, if it is determined that the quadratic approximation is suitable for the aforesaid purpose, to activate the fifth and sixth computing means and otherwise to use as an input to the seventh computing means the sum of the log-likelihood function and the residual function, which sum is used as input to the fourth computing means and is taken as the new said residual function.

2. An apparatus according to claim 1 wherein said estimator comprises a Kalman filter.

3. An apparatus according to claim 1 in a system for constructing a terrain profile under an aircraft's track, said sensing means of said apparatus comprising a radio or laser altimeter, a barometric altimeter and a dead-reckoning navigator.

4. An apparatus for measuring the state of a dynamic system comprising:
   (a) sensing means for producing a sequence of measurements or sets of measurements which are dependent upon the current state of the said system in the presence of noise and other sources of error being sources which are representable by a statistical model;
   (b) first computing means for determining a likelihood function associated with each of the said measurements or sets of measurements in accordance with the said statistical model;
   (c) second computing means for obtaining the product of the said likelihood function and a residual function which is initially set to be identically unity;
   (d) third computing means using a recursive estimator to model the dynamic behaviour of the system;
   (e) fourth computing means for determining a Gaussian approximation to the said product of the likelihood function and the residual function, the fit being weighted in dependence upon the present uncertainty in the state of the dynamic system as evidenced by the output of the said third computing means;
   (f) fifth computing means for deriving from the said Gaussian approximation parameters to serve as the basis for a measurement update within the third computing means;
   (g) sixth computing means for dividing the said Gaussian approximation into the said product of the likelihood function and the residual function which it approximates so as to form a new residual function;
   (h) seventh computing means for transforming the said residual function to take into account dynamic change in the state of the system during the interval between successive measurements or sets of measurements in the said measurement sequence; and
   (i) eighth computing means for determining whether the said Gaussian approximation is suitable to serve as an input to said third computing means and being operative, if it is determined that the Gaussian approximation is suitable for the aforesaid purpose, to activate the fifth and sixth computing means and otherwise to use as an input to the seventh computing means the product of the likelihood function and the residual function, which product is used as input to the fourth computing means and is taken as the new said residual function.

5. An apparatus according to claim 4 wherein said estimator comprises a Kalman filter.

6. An apparatus according to claim 4 in a system for constructing a terrain profile under an aircraft's track, said sensing means of said apparatus comprising a radio or laser altimeter, a barometric altimeter and a dead-reckoning navigator.

7. A navigation system using a recursive estimator for navigation integration wherein the parameters of a quadratic function approximating to a log-likelihood function are used as inputs to the estimator.

8. A navigation system according to claim 7 wherein said estimator comprises a Kalman filter.

9. A navigation system using a recursive estimator for navigation integration wherein the parameters of a Gaussian function approximating to a likelihood function are used as inputs to the estimator.

10. A navigation system according to claim 9 wherein said estimator comprises a Kalman filter.

11. A method of measuring the state of a dynamic system comprising the steps of:
    (a) producing a sequence of measurements or sets of measurements which are dependent upon the current state of the said system in the presence of noise and other sources of error being sources which are representable by a statistical model;

(b) determining a log-likelihood function associated with each of the said measurements or sets of measurements in accordance with the said statistical model;

(c) obtaining the sum of said log-likelihood function and a residual function which is initially set to be identically zero;

(d) transforming the said residual function to take into account dynamic change in the state of the system during the interval between successive measurements or sets of measurements in the said measurement sequence;

(e) utilising a recursive estimator to model the dynamic behaviour of the system;

(f) determining a quadratic approximation to the said sum of the log-likelihood function and the residual function, the fit being weighted in dependence upon the present uncertainty in the state of the dynamic system as evidenced by the modelled behavior of the system;

(g) determining whether the said quadratic approximation is suitable to serve as an input for said modelling of the behaviour of the system, and if it is determined that the quadratic approximation is suitable for the aforesaid purpose;

(h) deriving from the said quadratic approximation parameters to serve as the basis for a measurement update for the modelling of the behaviour of the system;

(i) subtracting the said quadratic approximation from the sum of the log-likelihood function and the residual function which it approximates so as to form a new residual function; and (j) otherwise using said sum of the log-likelihood function and the residual function used for determining said quadratic approximation as the new said residual function.

12. A method of measuring the state of a dynamic system comprising the steps of:

(a) producing a sequence of measurements or sets of measurements which are dependent upon the current state of the said system in the presence of noise and other sources of error being sources which are representable by a statistical model;

(b) determining a likelihood function associated with each of the said measurements or sets of measurements in accordance with the said statistical model;

(c) obtaining the product of the said likelihood function and a residual function which is initially set to be identically unity;

(d) transforming the said residual function to take into account dynamic change in the state of the system during the interval change in the state of the system during the interval between successive measurements or sets of measurements in the said measurement sequence;

(e) utilising a recursive estimator to model the dynamic behaviour of the system;

(f) determining a Gaussian approximation to the said product of the likelihood function and the residual function, the fit being weighted in dependence upon the present uncertainty in the state of the dynamic system as evidenced by the modelled behaviour of the system;

(g) determining whether the said Gaussian approximation is suitable to serve as an input for said modelling of the system, and if it is determined that the Gaussian approximation is suitable for the aforesaid purpose;

(h) deriving from the said Gaussian approximation parameters to serve as the basis for the modelling of the system;

(i) dividing the said Gaussian approximation into the said product of the likelihood function and the residual function which it approximates so as to form a new residual function; and (j) otherwise using said product of the likelihood function and the residual function used for determining said Gaussian approximation as said new residual function.

13. A method of using a recursive estimator for navigation integration in a navigation system wherein the parameters of a quadratic function approximating to a log-likelihood function are used as inputs to the estimator.

14. A method of using a recursive estimator for navigation integration in a navigation system wherein the parameters of a Gaussian function approximating to a likelihood function are used as inputs to the recursive estimator.

* * * * *